United States Patent [19]

Velishek et al.

[11] 3,906,467

[45] Sept. 16, 1975

[54] PLATED WIRE MEMORY

[75] Inventors: Francis P. Velishek, Savage; G. Patrick Bonnie, Richfield, both of Minn.

[73] Assignee: Control Data Corporation, Minneapolis, Minn.

[22] Filed: May 14, 1973

[21] Appl. No.: 360,227

[52] U.S. Cl. ................340/174 PW; 340/174 NA; 340/174 TF

[51] Int. Cl.[2] ........................................ G11C 11/155

[58] Field of Search ............. 340/174 TF, 174 PW, 174 QA, 340/174 ZB

[56] References Cited

UNITED STATES PATENTS

| | | | |
|---|---|---|---|
| 3,500,356 | 3/1970 | Feissel | 340/174 TF |
| 3,691,032 | 9/1972 | Luborsky et al. | 340/174 PW |
| 3,814,591 | 6/1974 | Holmen et al. | 340/174 PW |
| 3,843,335 | 10/1974 | Holmen | 340/174 PW |

*Primary Examiner*—James W. Moffitt
*Attorney, Agent, or Firm*—Robert M. Angus

[57] ABSTRACT

A plated wire memory according to the present disclosure includes a barrier layer disposed between a core of non-magnetic conductive material and an outer layer of highly permeable magnetic material, such as permalloy. The barrier layer is constructed of a conductive material which will not diffuse into the outer magnetic layer, an example of such material being gold or gold-copper alloy.

6 Claims, 2 Drawing Figures

PLATED WIRE MEMORY

Figure 1:
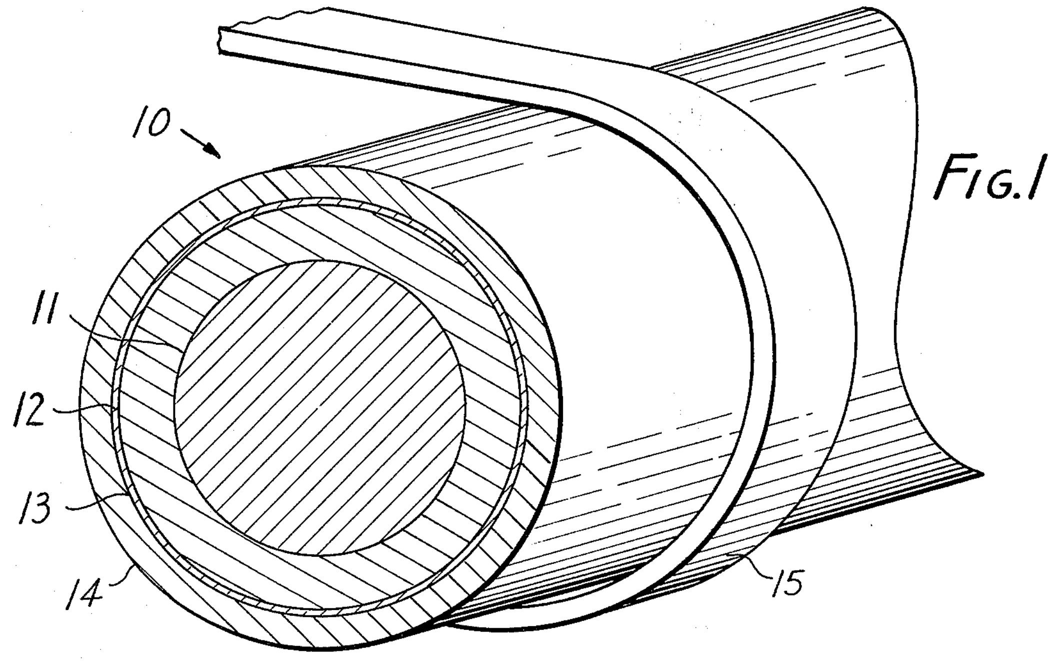

This invention relates to plated wire memory elements, and particularly to an improved plated wire memory element having a substantially longer field life than prior plated wire memory elements.

Plated wire memory elements are characterized by an inner conductive core or substrate having a surrounding layer or film of magnetic material. The magnetic film exhibits properties of non-magnetostrictivity and low coersive force for rapid switching. For example the film may be a zero magnetostrictive permalloy electroplated onto the core in a 30 oe easy axis field (the easy axis being normal to the length of the core or wire and the hard axis being along the axis of the core or wire). In use of the plated wire memory, a word line will develop a portion of the circumference of the plated wire memory so that application of a word current on the word line will induce a voltage in the conductive core, the polarity of the induced voltage being representative of the orientation of magnetization stored in the magnetic film.

Information is written or stored in the wire memory by the simultaneous application of a word current on the word line and a bit steering digit current on the core. Direction of the bit steering digit current determines a rest position of the magnetic vector in the circumference of the magnetic film; clockwise magnetization may represent a stored binary 1, while counterclockwise magnetization may represent a stored binary 0. To read the stored information, a word current is applied to the word line, thereby producing an axial field along the wire. The produced field tilts the magnetization vector from its circumferential rest position towards the axis of the wire, thereby producing a flux change in the film. The flux change induces a voltage in the core which is read (or sensed) by suitable equipment connected to the core. The amplitude of the word current is such that the anisotropy and demagnetization fields return the magnetization vector to its circumferential rest position when the word current ceases. Thus, the wire memory is highly useful for non-destructive readout memory systems.

One problem associated with prior plated wire memory elements resides in the fact that diffusion of material occurs between the conductive core material and the outer layer of magnetic material which will alter the anisotropy of the outer magnetic layer which affects the ability of the material to hold its magnetic orientation. While the cause of this diffusion is not precisely known, it is theorized that the conductive material absorbs gases, such as hydrogen, from the environment during a plating operation (when the magnetic material is plated onto the conductive material) and that during use of the memory element, the hydrogen and other materials out-gas from the conductive material into the magnetic material to produce a deleterious effect on the magnetic properties of the magnetic layer. It is further theorized that molecules of conductive material and magnetic material migrate (or diffuse) across the boundary region between them to contaminate the other material. It is theorized that conductive material and gases contaminate the magnetic material to such a degree as to seriously affect the magnetic properties and usefullness of the magnetic layer. While the diffusion is believed to be relatively slow, it is believed that increased environmental temperature increases the rate of diffusion and hence reduces the life expectancy of the usefulness of the memory element.

It is an object of the present invention to provide a plated wire memory element having a longer life than prior plated wire memory elements.

In accordance with the present invention, a barrier layer is disposed between the core of conductive material and the outer layer of magnetic material, the barrier layer being constructed of such conductive material as to not diffuse into the magnetic material and yet provide a sufficient barrier against diffusion from the conductive layer.

One feature of the present invention resides in the provision of a gold barrier layer.

Another feature of the present invention resides in the provision of a gold layer plated over a copper layer between the core and the outer layer of magnetic material, the arrangement being that gold diffused into the copper produces a copper-gold alloy at the boundary region between the copper and gold layers which effectively reduces diffusion of contaminates toward the outer layer of magnetic material.

Figure 2:
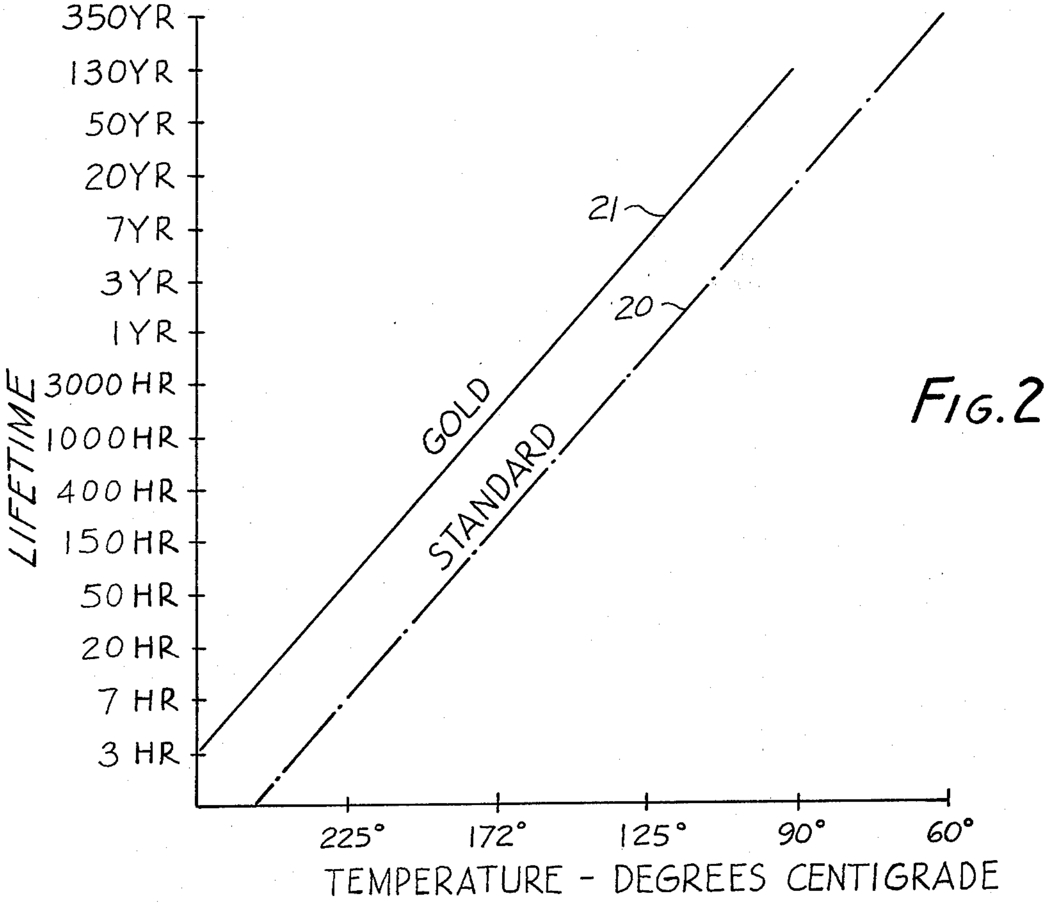

The above and other features of this invention will be more fully understood from the following detailed description and the accompanying drawings, in which:

FIG. 1 is a perspective view in cut-away cross-section of a plated wire memory element in accordance with the presently preferred embodiment of the present invention; and FIG. 2 is a graph illustrating the improved lifetime properties associated with the plated wire memory element in accordance with the present invention.

Referring to the drawings, and particularly FIG. 1, there is illustrated a plated wire memory 10 in accordance with the presently preferred embodiment of the present invention. Memory element 10 comprises an inner core 11 constructed of suitable conductive material, such as beryllium-copper No. 125 alloy. The beryllium-copper alloy is highly suitable for these purposes, since it is a highly conductive material and is nonmagnetic. Typically, the inner core 11 has a diameter of between about 1 and 5 mils, 3 mils being typical. Disposed over core 11 is a layer 12 constructed of suitable conductive material such as copper. Layer 12, which may have a thickness of between about 10,000 and 20,000 Angstroms, is plated over core 11 to form a suitable surface for depositing the subsequent layers thereon. Plated over layer 12 is a barrier layer 13, preferably constructed of gold and having a thickness of between about 200 and 1,000 Angstroms. A layer of highly permeable, low saturation magnetic material 14 having a thickness of about 9,000 Angstroms is plated over layer 13. By way of example, layer 14 may be constructed of a suitable permalloy comprising approximately 81% nickel. Another suitable material for magnetic layer 14 is Mu-metal comprising about 77% nickel, 14% copper and 3% molybdenum.

Barrier layer 13 is constructed of a material having low diffusion properties into the permalloy layer 14. Gold has been found to be a highly successful material for use as barrier layer 13. It is known that gold will diffuse toward the copper, but not toward the permalloy layer. It is believed that diffusion of gold into the copper layer produces a copper-gold alloy at the boundary region between layers 12 and 13 which is believed to be the principal barrier to migration of contaminates toward permalloy layer 14. Preliminary investigation reveals that pure gold per se will probably not produce the increased life expectancy achieved by a copper-gold barrier alloy. This investigation is supported by the fact that a gold layer overlying the beryllium-copper core (without a copper layer interface) will not produce the life expectancy achieved by a gold layer plated over a copper clad on the core as shown in FIG. 1.

The plated wire memory according to the present invention is produced by electrodepositing each layer 12, 13 and 14 over the core or previous layer in a 30 oe easy axis field. Preferably, the memory is subjected to a water rinse after each plating operation. After permalloy layer 14 is plated onto layer 13 and rinsed, the memory element is subjected to a stabilization heat treat anneal at 400°C for 60 seconds in a 30 oe easy axis field. It is believed that the heat treating step improves the magnetic characteristics of the permalloy layer as well as causes diffusion of gold into copper at the boundary region between layers 12 and 13 to produce the desirable copper-gold alloy.

It is believed that other materials may be utilized instead of gold in barrier layer 13, but such material must be a conductive material and must not diffuse toward the magnetic layer 14.

The inclusion of a thin layer 13, such as constructed of gold, substantially increases the life of plated wire memories elements. It is believed that the gold from layer 13 diffuses into copper layer 12 to produce the copper-gold alloy at the boundary region between layers 12 and 13 to substantially prevent diffusion of hydrogen and conductive material from beryllium-copper core 11 and from copper layer 12 toward permalloy layer 14.

With reference to FIG. 2, the effect of the barrier layer according to the present invention may be understood with respect to the increased life-time of plated wire memory element. FIG. 2 is a graph having as its mantissa the lifetime of a plated wire memory (shown in log base e) and having as its abscissa the inverse temperature of operation in degress centigrade. The temperature — life graph of a plated wire memory element according to the prior art (that is, a plated wire memory element not having a barrier layer) is shown at 20. At 21 is shown the temperature — life graph of a memory element having a gold barrier layer in accordance with the present invention. A comparison of graphs 20 and 21 will reveal a substantially increased lifetime expectancy of a plated wire memory element in accordance with the present invention. For example, at an environmental temperature of 125°C, a prior plated wire memory element will have a life expectancy of about 2000 hours, whereas with a gold barrier layer a plated wire memory element will have a life expectancy of about 6 years. Likewise, at 225°C the prior plated wire memory element will have a life expectancy of about 7 hours whereas at the same temperature a plated wire memory element according to the present invention will have a life expectancy of about 65 hours. At lower operating temperatures, such as about 90°C a wire according to the present invention will have a life expectancy of about 130 years, compared to a life expectancy of about 10 years for a prior wire memory.

In the use of the memory element according to the present invention the wire memory will be shielded from strong magnetic fields, but not necessarily from the earth's magnetic field. A flat word line 15 envelopes a portion of the circumference of the memory. Although only one word line 15 is shown associated with wire memory 10, it is understood that many such word lines may be provided along the axis of wire memory 10, all such word lines being disposed in individual planes normal to the axis of memory 10. Magnetic vector orientation in magnetic layer 14 is altered at the region of each word line by simultaneously applying a word current to selected word lines 15 and applying a digit current to core 11. The direction of the digit current will determine the rest magnetic vector orientation about the circumference of layer 14; a clockwise orientation representing a binary 1 and a counterclockwise orientation representing a binary 0. The orientation is read by applying a word current to the word line 15 to produce an axial field along layer 14, thereby producing a flux change as the magnetization vector tilts towards the axis. The flux change induces a voltage in the core, which in turn operates a sense wire.

The present invention thus provides a plated wire memory having a significantly longer life expectancy (e.g. up to a ten-fold increase) than prior plated wire memory elements. The memory element is useful for non-destructive read-out purposes without significantly increasing the cost of such memory element.

This invention is not to be limited by the embodiment shown in the drawings and described in the description, which is given by way of example and not of limitation, but only in accordance of the scope of the appended claims.

What is claimed is:

1. An elongated memory element comprising an elongated core having an outer surface, said core being contructed of non-magnetic conductive material, a first continuous layer of conductive material disposed over said outer surface of said core, a second continuous layer of conductive material disposed over said first layer so that said first layer is sandwiched between said core and said second layer, and a third continuous layer of magnetic material disposed over said second layer so that said second layer is sandwiched between said first and third layers, the material forming said second layer entirely separating said first and third layers and being of a type which does not diffuse toward the magnetic material forming said third layer.

2. The memory element according to claim 1 wherein said magnetic material is permalloy, said material forming said first layer is copper, and said material forming said second layer is gold.

3. The memory element according to claim 2 further including a copper-gold alloy at the boundary region between said first and second layers formed by diffusion of gold into the copper layer.

4. The memory element according to claim 2 wherein said core has a diameter of the order of between about 1 and 5 mils, said first layer has a thickness between about 10,000 and 20,000 Angstroms, said second layer has a thickness between about 200 and 1,000 Angstroms, and said third layer has a thickness of the order of about 9,000 Angstroms.

5. In a plated wire memory element of the class comprising a continuous layer of magnetic material surrounding the radial portion of an elongated core of conductive non-magnetic material, the improvement comprising: a continuous barrier layer sandwiched between said core and said layer of magnetic material, said barrier layer including a layer of gold and a copper layer between the core and said layer of gold, said barrier layer including a copper-gold alloy at the boundry region between said copper and gold layers, said barrier layer entirely separating said core and said layer of magnetic material.

6. The memory element according to claim 5 wherein said core has a diameter of the order of between about 1 and 5 mils, said layer of magnetic material has a thickness of the order of about 9,000 Angstroms, and said layer of gold has a thickness between about 200 and 1,000 Angstroms.

* * * * *